United States Patent [19]

Kennedy et al.

[11] Patent Number: 4,653,193
[45] Date of Patent: Mar. 31, 1987

[54] POLYFUNCTIONAL SPIRIT-LEVEL

[76] Inventors: Donald F. Kennedy, 562 Rimini Rd., Del Mar, Calif. 92014; Loren R. Wilson, 1430 Phillips St., Vista, Calif. 92083

[21] Appl. No.: 834,404
[22] Filed: Feb. 28, 1986
[51] Int. Cl.⁴ .............................................. G01C 9/20
[52] U.S. Cl. ..................................................... 33/379
[58] Field of Search ................ 33/379, 381, 383, 376, 33/377, 365, 389, 382, 383, 380

[56] References Cited

U.S. PATENT DOCUMENTS

| | | | |
|---|---|---|---|
| 35,298 | 5/1862 | Cahoon | 33/383 X |
| 2,014,420 | 9/1935 | Zieman | 33/381 |
| 2,520,700 | 8/1950 | Thorndike | 33/376 |
| 4,419,833 | 12/1983 | Wright | 33/379 |

Primary Examiner—William D. Martin, Jr.
Attorney, Agent, or Firm—John J. Murphey

[57] ABSTRACT

A polyfunctional spirit-level comprising a four-sided, elongated spirit-level body containing a bubble tube, axially disposed therein and adapted to be viewed from above when using three of the sides, two sides adapted for use as a level and two side adapted for use as a declination indicator for different slopes of sewer lines, said level small enough to be slipped in one's pocket and carried on one's person.

17 Claims, 7 Drawing Figures

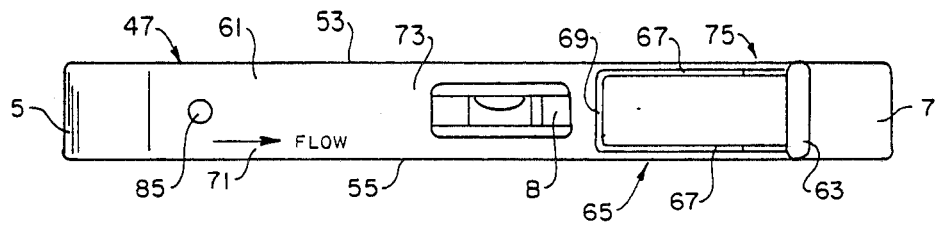
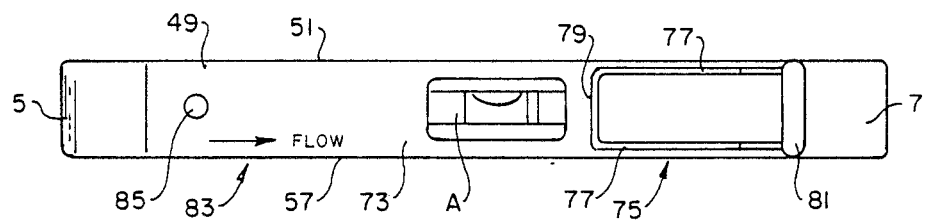
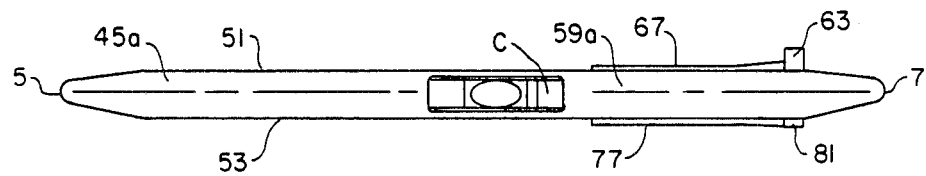
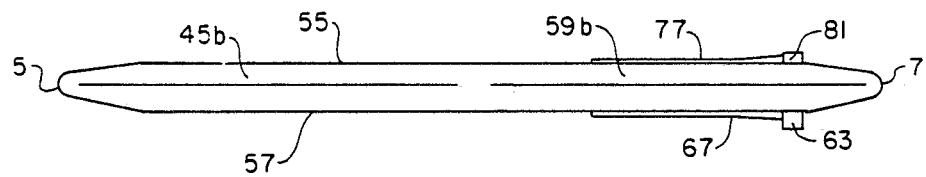

POLYFUNCTIONAL SPIRIT-LEVEL

BACKGROUND OF THE INVENTION

1. Field of the Invention

This invention pertains to the field of hand tools. More particularly, this invention concerns a spirit-level generally used by carpenters, plumbers and other tradesmen and in particular, concerns a polyfunctional spirit-level that may be used to determine levelness as well as at least two separate degrees of declination.

2. Description of the Prior Art

Spirit-levels are rather well-known in the art, see U.S. Pat. Nos. 1,211,882 and 2,102,364. Generally, they comprise an elongated body wherein is enclosed a short cylindrical transparent sealed tube not quite filled with a slightly viscose liquid so that an air bubble remains entrapped therein. When the tube is aligned axially within the body and the body placed atop a pair of spaced-apart points, the bubble will indicate when the points are parallel with the earth's surface, i.e., "level" by positioning itself midway between the ends of said tube. While some tubes are bowed in the middle, to aid in centering the bubble, others are straight and depend upon surface tension phenomena to aid in centering the bubble. Modernly, short spirit levels having tapered ends are used in the day-to-day activity of many workmen for denoting a level condition, see U.S. Pat. No. 4,419,833. However, in the plumbing trade, there is a need not only to determine the levelness between spaced apart points, but also to determine a minimum degree of declination in a drainage line.

Drainage lines must be sloped downward to provide for gravitational movement of slurried waste material. Construction codes require certain minimum degrees of slope or inclination depending upon the size of the drainage line. For instance, sewage lines three inches or less in diameter must meet the requirement of at least one-fourth inch vertical drop per foot of travel in the direction of flow, whereas sewage lines greater than three inches in diameter must meet a minimum declination of one-eighth inch vertical drop per foot of travel in the direction of flow.

Most sewer lines are installed in ditches that are wet, dirty, cramped and located under pillars, footings, floors and other overhangs. In addition, sewer line pipe is relatively short in length and usually contains at least one belled end so that a continuous sewer line would have periodic interruptions along the outer surface. These conditions make it very difficult to determine whether the sewer line has attained the proper minimum degree of slope. For these reasons, slopes in sewage lines are rarely checked other than by "eye-balling" and this crude method has resulted in inadequate slopes that, in turn, have resulted in many plugged sewer lines. The prior art does teach the use of spirit-levels to determine certain angles such as in railroad tracks, U.S. Pat. No. 487,375, and in ship keels, U.S. Pat. No. 35,298. There is little prior art teaching for the use of spirit-levels to indicate degrees of declination. Thus, there is to date no simple, expedient and easily portable pocket-sized spirit-level for use in determining absolute levelness, two degrees of slope and be useful in a ditch or other confined area generally encountered in certain trades such as the plumbing trade.

SUMMARY OF THE INVENTION

This invention solves all of the aforementioned problems in the prior art. It comprises a pocket-sized spirit-level easily carried by tradesmen. It includes at least one functional surface, and preferably two functional surfaces for determining the absolute levelness between spaced-apart points such as for use in the carpentry, electrical, masonry and plumbing trades. Further, it includes two other functional surfaces for determining different minimum degrees of declination, specifically for use in the plumbing trade. Further, the spirit-filled bubble tube is adapted to be observed in conjunction with the use of each functional surface and, in the preferred embodiment, is adapted to be observed from above the use with each functional surface so that it may be easily used in a ditch or other confined place. It is short enough in length to be useful within the straight surface between sewer pipe bell housings and yet long enough for use as a carpenter's level between spaced-apart points. In one embodiment, it contains an aperture through one portion of the body for ease in hanging the device on a peg or other cantilevered spike to prevent its damage during storage. Further, it is composed entirely of plastic (except for the liquid) so that it is safe for use in the electrical trade, see U.S. Pat. No. 4,419,833.

These and other objects of the invention will become apparent upon reading the Description of the Preferred Embodiment in conjunction with the Drawings appended hereto. The scope of invention to which the inventors claim a monopoly can be gleaned from a fair reading of the claims which conclude this specification.

DESCRIPTION OF THE DRAWINGS

FIG. 3 is a front elevational view of the embodiment shown in FIG. 1.

FIG. 4 is a rear elevational view of the embodiment shown in FIG. 1.

FIG. 5 is a top plan view of the embodiment shown in FIG. 1.

FIG. 6 is a bottom plan view of the embodiment shown in FIG. 1.

DESCRIPTION OF THE PREFERRED EMBODIMENT

Figure 1:
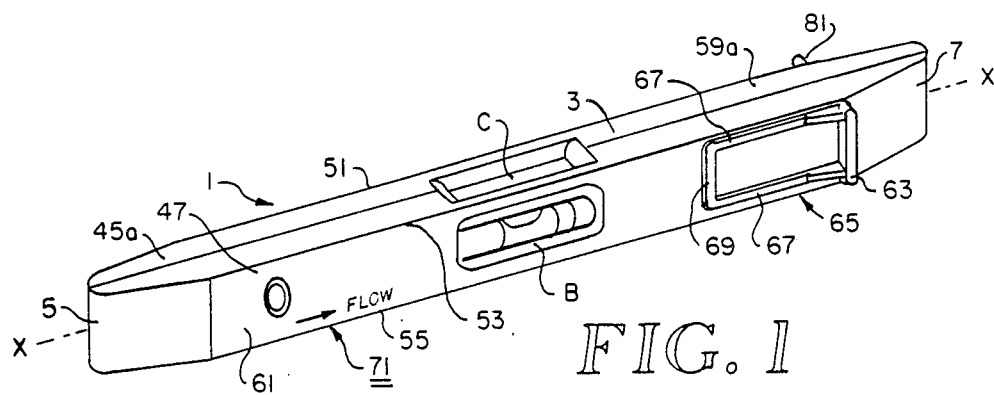
FIG. 1 is a perspective view of the preferred embodiment of the polyfunctional spirit-level of this invention.

The preferred embodiment of the polyfunctional spirit-level of this invention is shown in the drawings generally at 1 and is shown to comprise a narrow, elongated body 3 terminated at a pair of spaced-apart parallel ends 5 and 7. For ease of construction and as a safety precaution, no portion of this invention contains metal or other highly electrically conductive materials whatsoever. The elongated portion of body 3 is straight and is shown to conform to a major axis x—x.

Figure 2A:
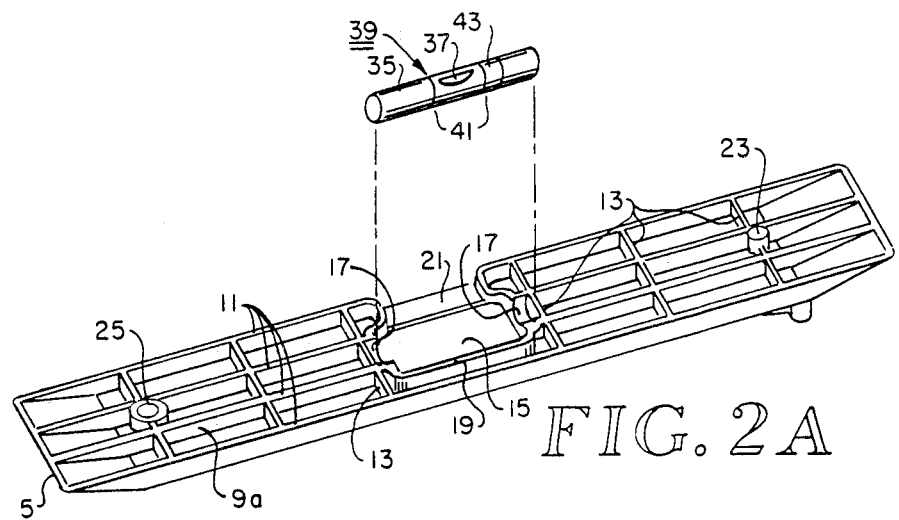
FIGS. 2A and 2B are exploded views of the embodiment shown in FIG. 1 showing the inner construction thereof and placement of the bubble tube therein.
Figure 2B:
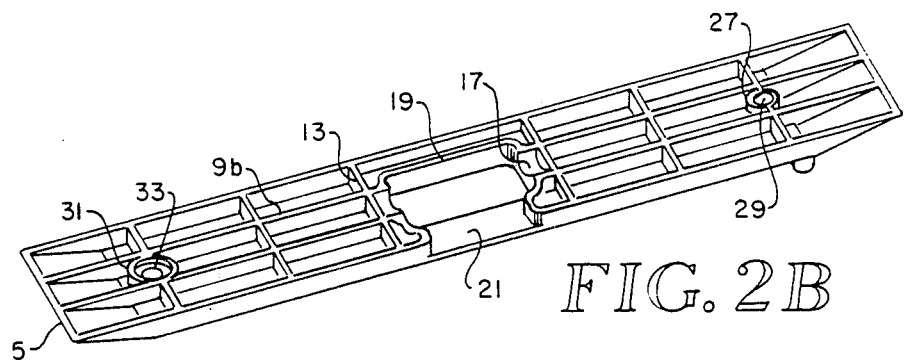

As shown in FIGS. 2A and 2B, body 3 conveniently made in a pair of mirror-image halves 9a and 9b by known processes such as injection molding. While the outer surfaces of body 3 will be described in detail later, the inner construction of body halves 9a and 9b comprise a series of parallel upstanding longitudinal walls 11 intersected by a series of likewise parallel upstanding lateral walls 13, said walls terminating along a common face or plane for later mating and joining together in mutual abutment by the use of glues, such as methyl ethyl ketone (MEK), to provide strong internal support.

Centrally located between ends 5 and 7 is a half receptacle 15 formed by a pair of spaced-apart half-cups 17, molded adjacent the central portion of lateral walls 13 and framed therein by a side wall 19 and a flat rib 21. When halves 9a and 9b are assembled, there is formed a pair of opposed side windows, A and B, and a top window C about receptacle 15. In body half 9a, a small diameter stud 23 extends upward, through said plane formed by the top of walls 11 and 13, from one intersection of said walls between half-cup 17 and end 7 and a larger diameter stud 25 extends upward, through said plane from another intersection of said walls between the opposite half-cup 17 and its nearest end 5. In said other body half 9b, a boss 27, containing therein a depression 29 of the size and shape of stud 23, and a second boss 31, containing therein a depression 33 of the size and shape of stud 25 are arranged to receive studs 23 and 25 therein only so that body halves 9a and 9b can be assembled in one direction only and in full and accurate registration therebetween.

Prior to assembling, a spirit-filled bubble tube 35 is positioned inside body 3 in alignment with axis x—x and straddled in half-cups 17. Bubble tube 35 is almost completely filled with a slightly viscose fluid containing a colorant so that an air bubble 37 remains entrapped therein that travels the length of said tube depending upon the angle said tube forms with the surface of the earth. Tube 35 also contains indices 39 comprising a pair of spaced-apart circumferential lines 41 placed about the circular portion of said tube and spaced equidistant from the ends thereof at a distance from each other substantially the width of bubble 37. In addition, a wide band 43 of a color different from lines 41 and from the colorant in spirit-filled bubble tube 35 is placed around the circular portion of bubble tube 35 between one end of said tube and the nearest circumferential line of lines 41 and adjacent to said line. An example is where the spirit liquid is colored green, lines 41 are black and band 43 is red. As will be more fully explained, indices 39 provide a visual indication of levelness when used for that purpose and further provide visual indication of a minimum satisfactory degree of declination when used with the other functional surfaces of this invention.

While the axial length of spirit-level body 3 may be enclosed in a minimum of three elongated functional surfaces, to form a triangular cross-sectional configuration, and the same is fully contemplated within the scope of this invention, it is preferred that body 3 be enclosed in four elongated functional surfaces to form a quadralateral cross-sectional configuration. As shown in FIGS. 3 through 6, body 3 is enclosed in four elongated functional surfaces, namely, a pair of level-indicating first functional surfaces 45a and 45b, a first slope indicating second functional surface 47 and a second slope indicating third functional surface 49 wherein said surfaces extend lengthwise along body 3 from end 5 to end 7 and over the full width of body 3 to form four parallel edges 51, 53, 55, and 57.

Level-indicating first functional surfaces 45a and 45b comprise planar faces 59a and 59b coextensive therewith for supporting body 3 atop a pair of points to indicate a degree of levelness therebetween. The term "pair of points" is used to indicate a surface, a plurality of points or a line over which body 3 is placed or supported so that air bubble 37 will center in bubble tube 35 between lines 41 when said points are level therebetween.

Second functional surface 47 comprises a face 61 coextensive therewith containing a narrow, elongated raised portion or pad 63 near end 7 extending thereacross from edge 53 to edge 55. A frame 65 comprising a pair of spaced-apart, narrow frame sides 67, extending from the ends of pad 63 along face 61 parallel to edges 53 and 55 and joined by cross-frame 69, form a ramp that is used to stabilize pad 63 and spirit-level 1 when second functional surface 47 is placed atop a downwardly sloping pipe, face 61 to the pipe, so that pad 63 and another spaced-apart portion of face 61 near the beginning of the taper at opposite end 5 supports body 3 in a manner such that, if the minimum slope of said pipe exists, bubble 37 will appear to the left of band 43 on the opposite side thereof from pad face 63. Because of the roundness of the pipe upon which body 3 is placed, frame 65 provides stability to body 3 and aids in preventing spirit-level 1 from rocking or falling off the pipe. To aid the user in determining the proper orientation of spirit-level 1 on the sloping pipe, a flow indicator means 71 comprising an arrow and the word "FLOW" is provided on face 61.

Third functional surface 49 comprises a face 73, virtually identical to face 61 that is coextensive with surface 49 and contains a frame 75 comprising frame sides 77, cross-frame 79 and pad 81 wherein pad 81 is less in height than pad 63 for use to indicate the minimum satisfactory degree of declination in a sloping pipe. Flow indicator means 83, comprising an arrow and the word "FLOW" is provided on face 73 to aid the user in properly oriented spirit-level 1 on a sloping pipe. An aperture 85 is formed through large stud 25 and boss 31 for the purpose of facilitating hanging spirit-level 1 on a peg or other projection.

What is claimed is:
1. A polyfunctional spirit-level comprising:
   (a) a narrow, elongated spirit-level body, enclosed in at least three independently usable elongated functional surfaces and terminated at spaced-apart ends, having disposed therein a spirit-filled bubble tube adapted for observation when using each said functional surface, said tube containing visual indices denoting a minimum satisfactory condition for each function;
   (b) a first functional surface comprising a planar face for supporting said body atop a pair of points to cause said bubble tube to indicate a degree of levelness therebetween;
   (c) a second functional surface comprising a face containing near one end thereof a raised portion for supporting, along with a spaced-apart portion of said face, said body atop a pair of points in a first declining path to cause said bubble tube to indicate a minimum satisfactory degree of declination in said path; and,
   (d) a third functional surface comprising a face containing near one end thereof a second raised portion for supporting, along with a spaced-apart portion of said face, said body atop a pair of points in a second declining path to cause said bubble tube to indicate a minimum satisfactory degree of declination in said second path.

2. The polyfunctional spirit-level of claim 1 including observation windows formed in said surfaces for viewing said bubble tube from above during use of each said functional surface.

3. The polyfunctional spirit-level of claim 1 wherein said bubble tube is disposed midway between said body terminal ends.

4. The polyfunctional spirit-level of claim 1 wherein said second and third functional surfaces are separated by a pair of opposed first functional surfaces to provide a four-sided spirit-level body containing two planar faces for use in indicating a degree of levelness between a pair of points.

5. The polyfunctional spirit-level of claim 1 wherein said raised portions on said second and said third functional surfaces are located near the same terminal end of said body.

6. The polyfunctional spirit-level of claim 1 further including an aperture formed near one of said terminal ends through said body to facilitate hanging said spirit-level on a peg or other projection.

7. The polyfunctional spirit-level of claim 1 wherein said body is of short length and said terminal ends are tapered on at least two sides thereof for ease in inserting said device in a pocket.

8. A polyfunctional spirit-level comprising:
(a) a narrow, elongated spirit-level body, enclosed in at least three independently usable elongated functional surfaces and terminated at spaced-apart ends, having disposed therein a spirit-filled bubble tube adapted for observation, through windows formed in said functional surfaces, when using each said functional surface, said tube containing visual indices denoting a minimum satisfactory condition for each function;
(b) a first functional surface comprising a planar face for supporting said body atop a pair of points to cause said bubble tube to indicate a degree of levelness therebetween;
(c) a second functional surface comprising a face containing near one end thereof a first raised portion for supporting, along with a spaced-apart portion of said face, said body atop a pair of points in a first declining path to cause said bubble tube to indicate a minimum satisfactory degree of declination in said path; and,
(d) a third functional surface comprising a face containing near one end thereof a second raised portion for supporting, along with a spaced-apart portion of said face, said body atop a pair of points in a second declining path to cause said bubble tube to indicate a minimum satisfactory degree of declination in said second path.

9. The polyfunctional spirit-level of claim 8 wherein said bubble tube is disposed midway between said terminal ends.

10. The polyfunctional spirit-level of claim 8 wherein said second and third functional surfaces are separated by a pair of opposed first functional surfaces to provide a four-sided spirit-level body containing two planar faces for use in indicating a degree of levelness between a pair of points.

11. The polyfunctional spirit-level of claim 8 wherein said raised portions on said second and said third functional surfaces are located near the same terminal end of said body.

12. The polyfunctional spirit-level of claim 8 further including an aperture formed near one of said terminal ends, through said body, to allow hanging of said level on a peg or other projection.

13. The polyfunctional spirit-level of claim 8 wherein said body is short and said terminal ends are tapered on at least two sides thereof for ease in inserting said device in a pocket.

14. A polyfunctional spirit-level comprising:
(a) a narrow, elongated spirit-level body, enclosed in four independently usable functional surfaces and terminated at spaced-apart ends, having disposed therein and midway between said terminal ends a spirit-filled bubble tube adapted for observation through windows formed in said body, when using each said functional surface, said tube containing visual indices denoting a minimum satisfactory condition for each function;
(b) a pair of spaced-apart first functional surfaces each comprising a planar face for supporting said body atop a pair of points to cause said bubble tube to indicate a minimum satisfactory degree of levelness therebetween;
(c) a second functional surface comprising a face containing near one end thereof, a raised portion for supporting, along with a spaced-apart portion of said face, said body atop a pair of points in a first declining path to cause said bubble tube to indicate a minimum satisfactory degree of declination in said path; and,
(d) a third functional surface comprising a face containing near one end thereof a second raised portion for supporting along with a portion of said face, said body atop a pair of points in a second declining path to cause said bubble to indicate a minimum satisfactory degree of declination in said path.

15. The polyfunctional spirit-level of claim 14 wherein said raised portions on said second and said third functional surfaces are located near the same terminal end of said body.

16. The polyfunctional spirit-level of claim 14 further including an aperture formed near one end of said body to allow hanging of said level from a projection.

17. The polyfunctional spirit-level of claim 14 wherein said level body is short and contains tapered ends for ease in placing in one's pocket.

* * * * *